T. A. EDISON.
AUTOMOBILE.
APPLICATION FILED APR. 17, 1908.
947,806.
Patented Feb. 1, 1910.
2 SHEETS—SHEET 1.
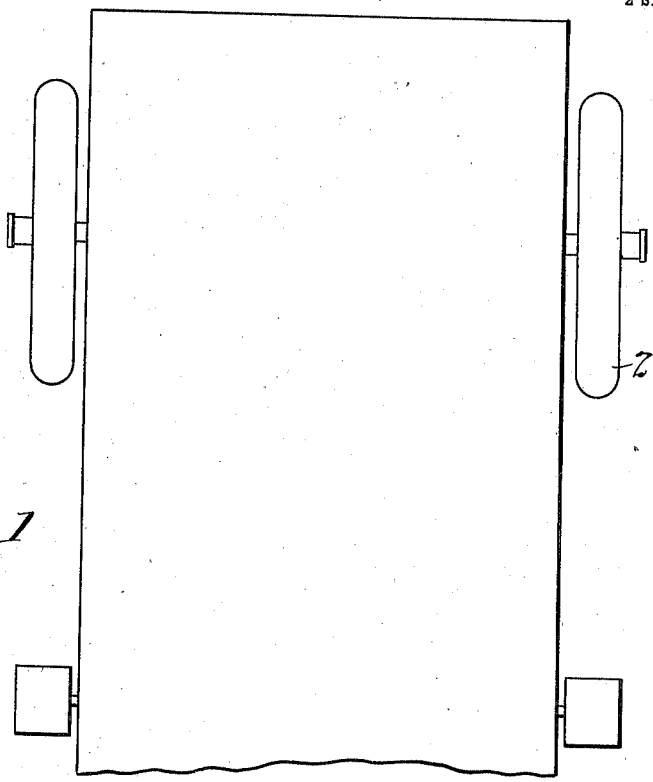
Fig.1
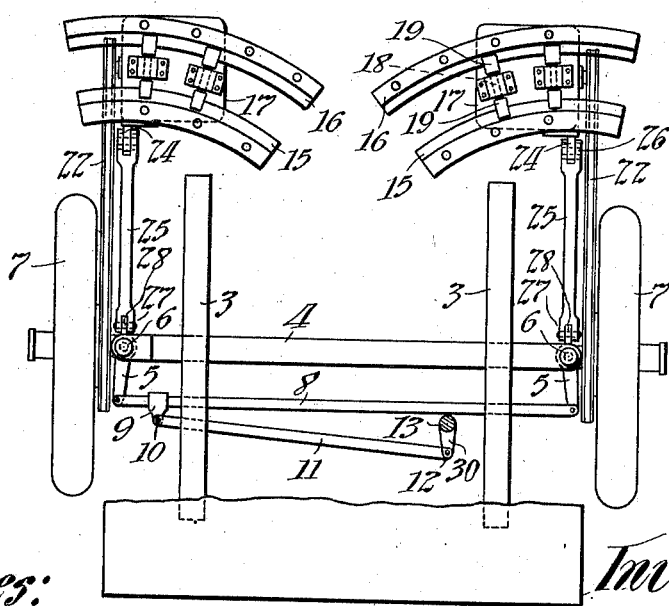
Witnesses:
Frank D Lewis
Hubert H Dyke
Inventor:
Thomas A. Edison
by Frank L. Dyer
Atty.

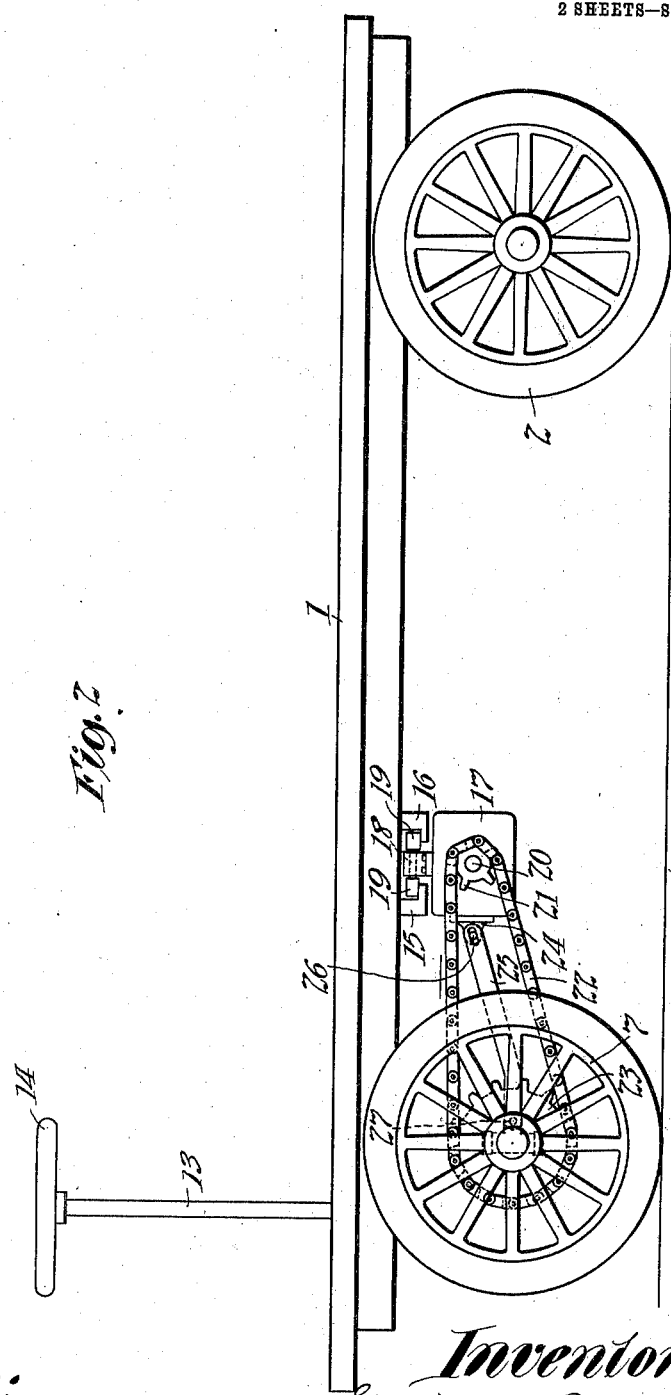

UNITED STATES PATENT OFFICE.

THOMAS A. EDISON, OF LLEWELLYN PARK, ORANGE, NEW JERSEY.

AUTOMOBILE.

947,806.

Specification of Letters Patent.

Patented Feb. 1, 1910.

Application filed April 17, 1908. Serial No. 427,682.

*To all whom it may concern:*

Be it known that I, THOMAS ALVA EDISON, a citizen of the United States, residing at Llewellyn Park, Orange, in the county of Essex and State of New Jersey, have invented certain new and useful Improvements in Automobiles, of which the following is a description.

My invention relates to self propelled vehicles or automobiles in which the steering wheels are mounted upon knuckles which turn upon vertical axes so as to vary the angle of the axes of said wheels with respect to the body of the vehicle, and has for its object the application of driving means to said wheels in such a manner as to move with said wheels about the vertical axes of the steering knuckles, said driving means being supported by the body of the vehicle and movable with respect thereto.

In order that my invention may be more fully understood, reference is hereby made to the accompanying drawing, forming part of this specification, of which—

Figure 1 is a plan view of an automobile constructed in accordance with my invention, part of the body being broken away, and Fig. 2 is a side elevation of said vehicle.

In these views, corresponding parts are represented by the same numerals of reference.

In the structure shown, the vehicle body 1 is supported at its rear by a fixed axle upon which the wheels 2 are rotatably mounted, and its forward end rests upon springs 3, carried by the transverse rod 4, at the ends of which the steering knuckles 5 are mounted, the same being capable of oscillation upon a vertical axis 6, and the front wheels 7 are rotatable upon axles extending outward from said steering knuckles. Means are provided for moving said knuckles, said means being shown as a transverse rod 8, pivoted at each end to the forwardly extending arms of said knuckles, and having a lug 9 pivoted at 10 to a link 11, the other end of which is pivoted at 12 to an arm 30 rigid with a vertical rock shaft 13, which may be operated by the hand wheel 14.

The body 1 is provided with curved tracks 15 and 16 concentric with the axes 6 of the steering knuckles 5, and upon said tracks are hung the frames or bodies of the motors 17, which as shown, are electric motors, the bodies depending from and being supported by horizontal spindles 18, the ends of which are provided with rollers 19, which rest upon the tracks 15 and 16. The motor shafts 20 are provided at their outer ends with sprockets 21, around which pass chains 22, which engage sprockets 23, secured to the wheels 7. There is a lug 24 rigid with each of the motor frames and connected with a forwardly extending arm or link 25 by a pin-and-slot connection 26. The forward ends of the links 25 are pivoted at 27 to arms or lugs 28 integral with the steering knuckles.

When the front wheels are turned upon the axes 6 of the steering knuckles 5 by means of the hand wheel 14 and rock shaft 13, the links 25 will be moved by the arms 28 of the steering knuckles and will cause the motors 17 to move in an arc concentric with said axes 6, the supporting rollers 19 rolling along the tracks 15 and 16, whereby the relative positions of the motors 17 remain unchanged with respect to the steering knuckles and the wheels 7 carried thereby, all of said parts moving with respect to the vehicle body around the axes 6. The pin-and-slot connection 26 permits relative movements of said body and wheels in a vertical direction, due to the resilience of the supporting springs 3.

Having now described my invention, what I claim is:

1. In an automobile, the combination of the body, wheel, and wheel support mounted to turn on a vertical axis, a motor supported by said body and movable along an arc concentric with said vertical axis, and a driving connection between said motor and said wheel, substantially as set forth.

2. In an automobile, the combination of the body, wheel and wheel support movable upon a vertical axis, a motor supported by said body, a driving connection between said motor and said wheel, and a connection between the motor and wheel support, whereby a movement of the latter causes said motor to move therewith, substantially as set forth.

3. In an automobile, the combination of a body with a supporting wheel therefor movable upon a vertical axis, a curved track concentric with said axis, a motor supported by and movable along said track, and a driving connection between said motor and said wheel, substantially as set forth.

4. In an automobile, the combination of a body, a wheel and a wheel support movable upon a vertical axis, a curved track concentric with said axis, a motor supported by and movable along said track, a driving connection between said motor and said wheel, and a connection between said motor and wheel support, whereby said parts are caused to move together, substantially as set forth.

5. In an automobile, the combination of a body having a curved track, rollers supported on said track, a motor supported by said rollers, a wheel movable upon a vertical axis concentric with said curved track, and a driving connection between said motor and said wheel, substantially as set forth.

6. In an automobile, the combination of a body having a curved track, rollers supported on said track, a motor supported by said rollers, a wheel and wheel support movable upon a vertical axis concentric with said curved track, a driving connection between said motor and said wheel, and a connection between said motor and said wheel support whereby said parts are caused to move together, substantially as set forth.

This specification signed and witnessed this 13th day of March 1908.

THOS. A. EDISON.

Witnesses:
FRANK D. LEWIS,
H. H. DYKE.